United States Patent
Boatwright et al.

(10) Patent No.: US 7,699,602 B2
(45) Date of Patent: Apr. 20, 2010

(54) GLASSWARE MOLD LUBRICATION BURNER

(75) Inventors: Jayson Douglas Boatwright, Mile End (AU); Gary Pricket, Woodcroft (AU); Garret L. Scott, Toledo, OH (US); D. Wayne Leidy, Perrysburg, OH (US); Charles B. Obee, Toledo, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 760 days.

(21) Appl. No.: 11/431,795

(22) Filed: May 10, 2006

(65) Prior Publication Data

US 2007/0277558 A1 Dec. 6, 2007

(51) Int. Cl.
*F23Q 3/00* (2006.01)
*F23Q 7/06* (2006.01)

(52) U.S. Cl. .............. 431/264; 431/132; 431/258; 431/265; 431/266

(58) Field of Classification Search ........ 65/26, 65/169; 431/132, 258, 264–266; 336/90, 336/96
See application file for complete search history.

(56) References Cited

U.S. PATENT DOCUMENTS

| | | | |
|---|---|---|---|
| 1,904,549 A * | 4/1933 | Scognamillo et al. ...... 431/66 |
| 2,289,675 A * | 7/1942 | Ofeldt .................... 431/187 |
| 2,668,592 A | 2/1954 | Piros et al. |
| 3,361,185 A * | 1/1968 | Anderson et al. ....... 126/91 R |
| 3,390,942 A * | 7/1968 | Klingberg ................ 431/114 |
| 3,674,093 A * | 7/1972 | Reese ..................... 166/299 |
| 3,739,990 A * | 6/1973 | Triggs .................... 239/425 |
| 4,391,582 A * | 7/1983 | Cowan ................... 431/266 |
| 4,494,923 A | 1/1985 | Guillaume et al. |
| 4,604,048 A * | 8/1986 | Schwartz et al. ............ 431/8 |
| 4,683,518 A * | 7/1987 | Gwozdz .................. 361/263 |
| 4,892,475 A | 1/1990 | Farrenkopf et al. |
| 4,926,087 A * | 5/1990 | Kler et al. .............. 313/131 A |
| 5,217,363 A | 6/1993 | Brais et al. |
| 5,406,047 A * | 4/1995 | Katschinski et al. ... 219/121.52 |
| 5,679,409 A | 10/1997 | Seeman |
| 5,772,421 A | 6/1998 | Besik et al. |
| 6,582,220 B2 * | 6/2003 | Heck et al. ............... 431/258 |
| 6,902,708 B1 | 6/2005 | Nutz, Jr. et al. |

(Continued)

FOREIGN PATENT DOCUMENTS

GB 2308179 A 6/1997

*Primary Examiner*—Kenneth B Rinehart
*Assistant Examiner*—Daniel A Bernstein

(57) ABSTRACT

A burner for depositing carbon soot on a glassware mold includes a burner nozzle having an annular array of individual gas outlet ports, a fuel passage within the nozzle connected to a first plurality of the outlet ports and an oxidant passage in the nozzle connected to a second plurality of the outlet ports. The first plurality of outlet ports individually alternate with the second plurality of outlet ports around the annular array such that the array presents alternate fuel and oxidant outlet ports around the array. An ignition electrode is disposed on the burner nozzle within the annular array of outlet ports for igniting fuel and oxidant emerging from the outlet ports. The ignition electrode preferably is in the form of an elongated ignition electrode rod telescopically surrounded by an insulator and centered on the burner nozzle within the annular array of outlet ports, and a ground electrode telescopically surrounding the insulator. The ground electrode preferably is part of the burner nozzle and is electrically connected to a burner mounting block on which the burner nozzle is mounted.

9 Claims, 4 Drawing Sheets

U.S. PATENT DOCUMENTS

| | | | |
|---|---|---|---|
| 7,383,694 B2 * | 6/2008 | Cramer | 65/26 |
| 2003/0175424 A1 | 9/2003 | Seeman | |
| 2003/0221455 A1 * | 12/2003 | Scott et al. | 65/26 |
| 2006/0144088 A1 * | 7/2006 | Green et al. | 65/26 |
| 2007/0026350 A1 * | 2/2007 | Scott et al. | 431/132 |

* cited by examiner

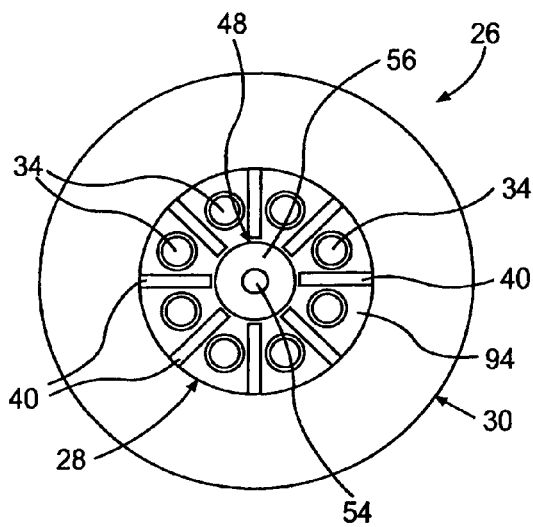
FIG. 2
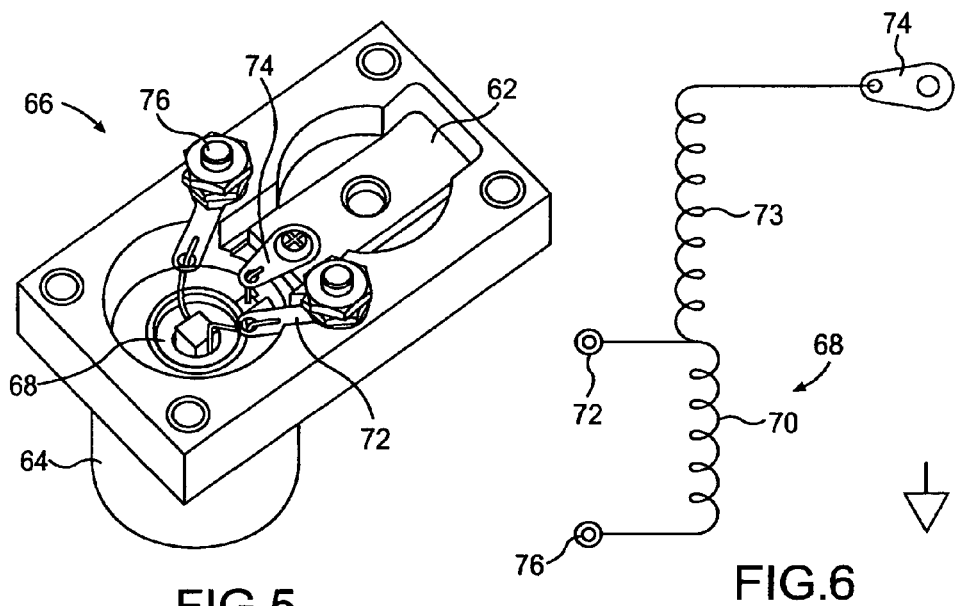
FIG. 5
FIG. 6

GLASSWARE MOLD LUBRICATION BURNER

The present disclosure relates to spark ignition of gases emerging from a burner to deposit soot on the glass-contacting surfaces of a glassware forming mold.

BACKGROUND AND SUMMARY OF THE DISCLOSURE

U.S. patent document 2003/0221455A1 discloses a system for flame-deposition of carbon onto the glass-contacting surfaces of a glassware forming mold. A burner includes a nozzle having separate fuel and oxidant gas passages that terminate in respective pluralities of outlet ports from the nozzle. The pluralities of outlet ports preferably form an annular composite array in which the fuel and oxidant outlet ports alternate with each other. The oxidant outlet ports preferably comprise slots having long dimensions radial to the annular array. The fuel outlet ports preferably are circular. A pair of spark electrodes, including an ignition electrode and a ground electrode, are spaced from each other and disposed within the gas stream emerging from the burner. The electrodes are energized to ignite the carbon-containing gas mixture and form a flame that precipitates electrically conductive carbon particles onto the glass-contacting surfaces of the mold.

Immersion of the electrodes in the flame path makes the electrodes susceptible to carbon buildup. Furthermore, the electrodes can deflect or alter the flame pattern, particularly as carbon builds up on the electrodes, resulting in less than optimum carbon deposition on the mold surfaces. U.S. application Ser. No. 11/190,366 filed Jul. 27, 2005 discloses a burner in which one of the electrodes is carried by the burner nozzle so as to be surrounded by the ignited flame while the other electrode is positioned outside of the flame. It is a general object of the present disclosure to provide a glassware mold lubrication system that reduces or eliminates carbon deposition on the spark electrodes, in which the electrodes do not affect the flame pattern of the ignited carbon-containing gas, and in which the spark electrodes (both ignition and ground electrodes) are carried as an assembly with the burner nozzle.

The present disclosure embodies a number of aspects that can be implemented separately from or in combination with each other.

A burner for depositing carbon soot on a glassware mold, in accordance with one aspect of the present disclosure, includes a burner nozzle having an annular array of individual gas outlet ports, a fuel passage within the nozzle connected to a first plurality of the outlet ports and an oxidant passage in the nozzle connected to a second plurality of the outlet ports. The first plurality of outlet ports individually alternate with the second plurality of outlet ports around the annular array such that the array presents alternate fuel and oxidant outlet ports around the array. An ignition electrode is disposed on the burner nozzle within the annular array of outlet ports for igniting fuel and oxidant emerging from the outlet ports. The ignition electrode preferably is in the form of an elongated ignition electrode rod telescopically surrounded by an insulator and centered on the burner nozzle within the annular array of outlet ports, and a ground electrode telescopically surrounding the insulator. The ground electrode preferably is part of the burner nozzle and is electrically connected to a burner mounting block on which the burner nozzle is mounted.

BRIEF DESCRIPTION OF THE DRAWINGS

The disclosure, together with additional objects, features, advantages and aspects thereof, will best be understood from the following description, the appended claims and the accompanying drawings, in which:

FIG. 2 is an end view of the burner nozzle and spark electrode assembly in the burner of FIG. 1;

FIG. 5 is a perspective view of the ignition module assembly in the burner of FIG. 1; and FIG. 6 is an electrical schematic diagram of the ignition module assembly of FIG. 4.

DETAILED DESCRIPTION OF PREFERRED EMBODIMENTS

The disclosure of U.S. patent document 2003/0221455A1 is incorporated herein by reference.

Figure 1:
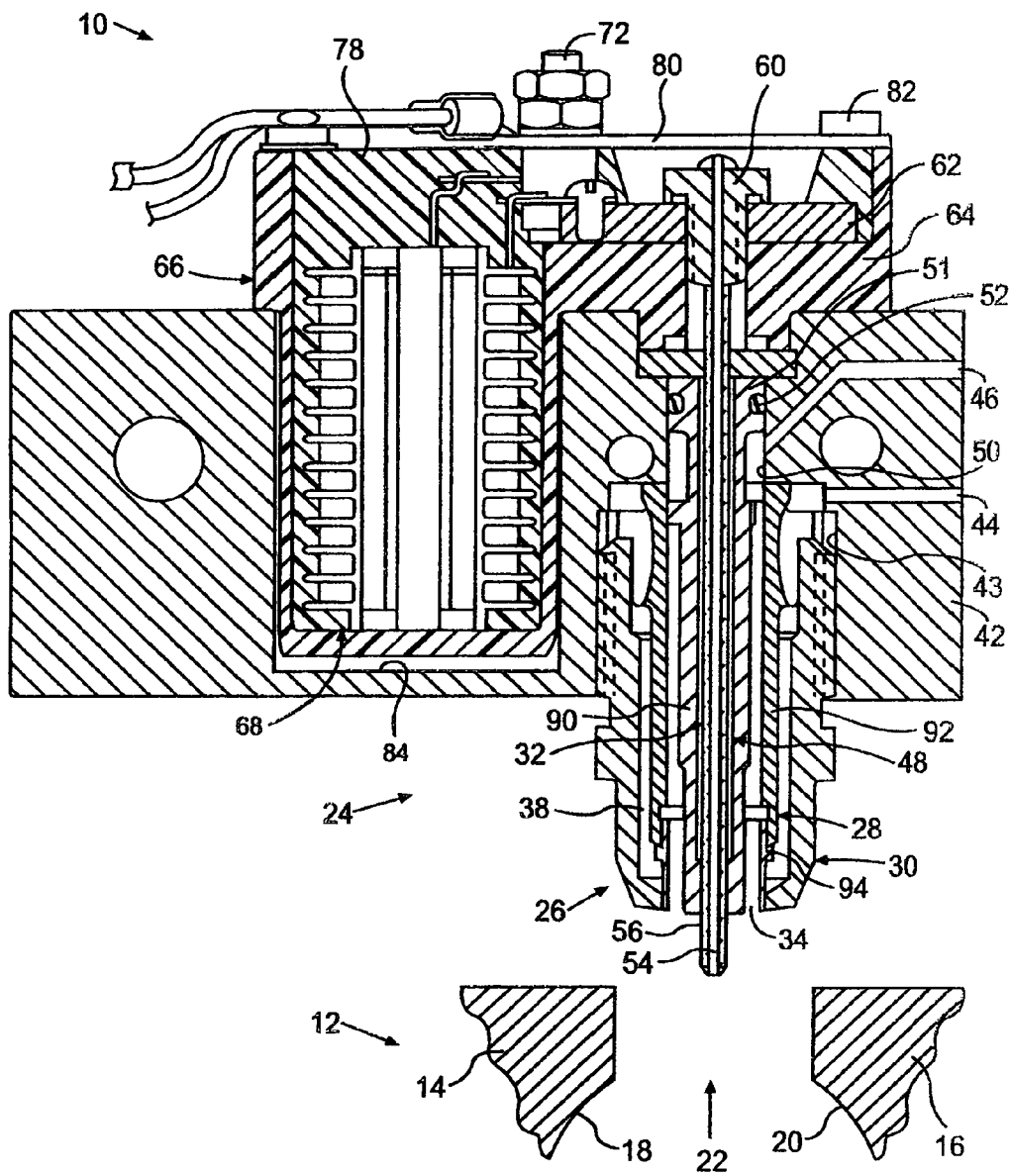
FIG. 1 is a fragmentary sectional view of a glassware mold lubrication system in accordance with an exemplary embodiment of the present disclosure.

FIG. 1 illustrates a system 10 for lubricating the glass-contacting surfaces of a glassware forming mold 12. Mold 12 is illustrated by way of example as including a pair of mold sections 14,16 having respective glass-contacting surfaces 18,20. Mold 12 has an open end 22 that is aligned with a gas burner 24. (It will be appreciated that burner 24 and system 10 are moved into and out of alignment with open end 22 during operation of the glassware forming system.) Burner 24 preferably includes a burner nozzle 26 that is generally of the type disclosed in above-noted U.S. patent document 2003/0221455A1, including an inner member or tip 28 carried within an outer member or cap 30. A first gas passage 32, preferably a fuel gas passage, extends through tip 28 and terminates in an annular array of outlet ports 34 (FIG. 2). A second gas passage 38, preferably an oxidant gas passage, extends between tip 28 and cap 30 to a second annular array of outlet ports 40 (FIG. 2). As best seen in FIG. 2, outlet ports 34,40 preferably alternate with each other in a composite annular array of outlet ports. Ports 34, which preferably are fuel outlet ports, preferably are of circular geometry as best seen in FIG. 2, while ports 40, which preferably are oxidant outlet ports, preferably are in the form of slots having long dimensions extending radially of the annular array. This preferred annular port construction has the advantage of generating an annular gas mixture downstream from the outlet end of burner nozzle 26, in which the center is oxidant-rich due to the slot-shaped geometries of ports 40. Other burner nozzle outlet port configurations can be employed.

Figure 3:
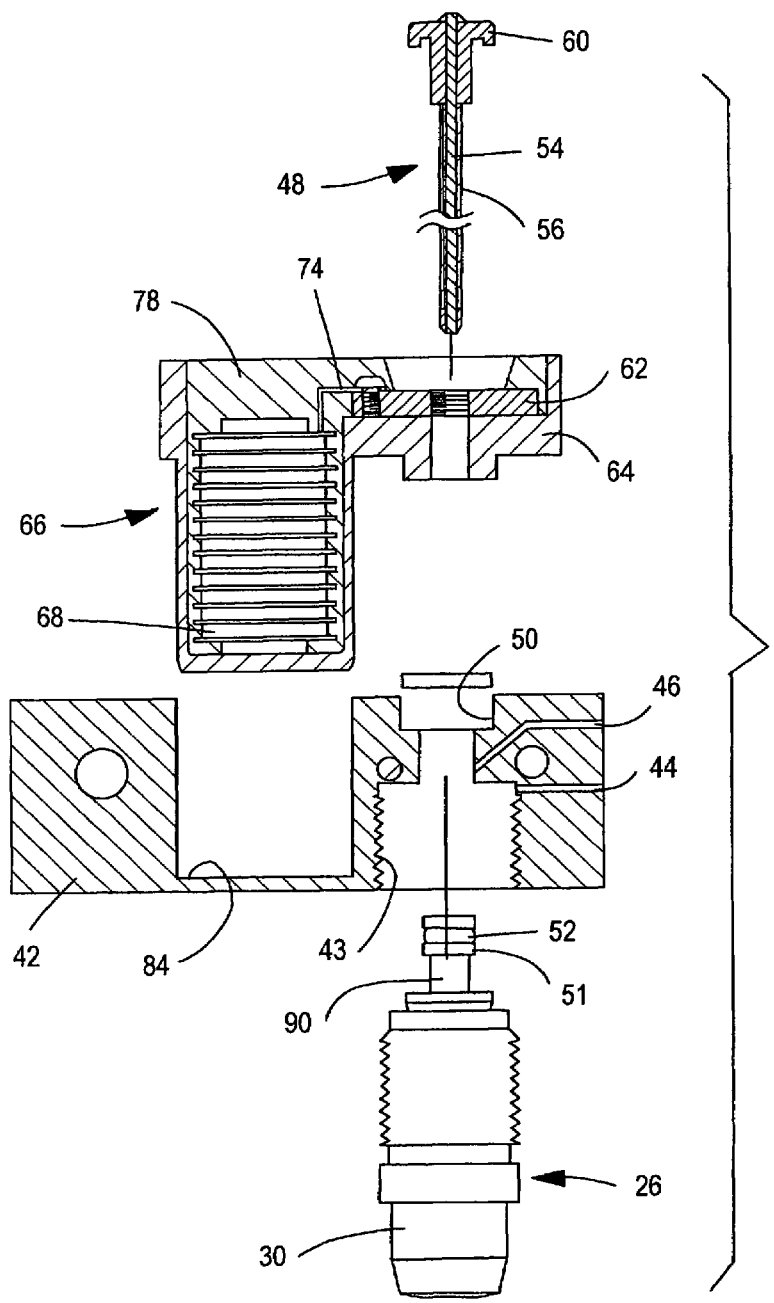
FIG. 3 is an exploded partially sectioned elevational view of the burner of FIG. 1.
Figure 4:
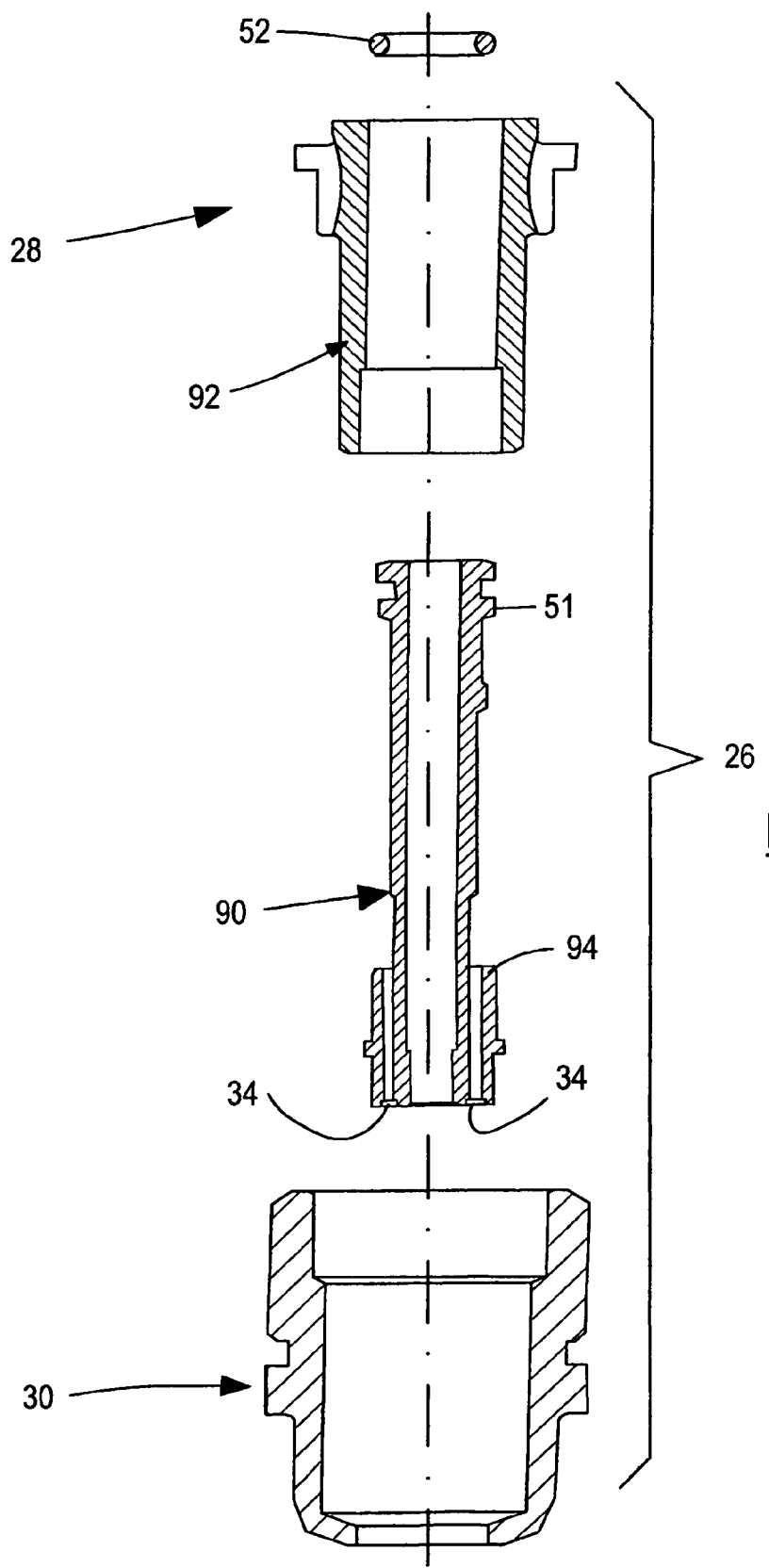
FIG. 4 is an exploded sectional view of the burner nozzle in FIGS. 1-3.

Tip 28 is mounted within cap 30, and cap 30 is mounted within a burner block 42 (FIGS. 1 and 3), preferably by being threadably received within a corresponding opening 43 in the burner block. In the illustrated exemplary embodiment of the disclosure, burner tip 28 is a two-piece assembly that includes a tip orifice 90 secured within a tip housing 92. Passages 32 include an annular passage that extends between tip orifice 90 and housing 92, and then individual passages that extend through the end 94 of tip orifice 90 to ports 34. Burner block 42 has a first gas passage 44 that communicates in assembly with passage 38 in nozzle 26 for feeding oxidant to outlet ports 40 (FIG. 2). Outlet ports preferably are disposed in tip orifice 90. Burner block 42 has a second gas passage 46 that communicates in assembly with passage 32 in nozzle 26 for feeding combustible fuel to outlet ports 34 (FIG. 2). Passages 44, 46 may be of any suitable geometry, with those illustrated in FIG. 1 being by way of example only. The upper end 51 of tip orifice 90 is telescopically received within a passage 50 of burner block 42. An O-ring or other suitable gasket sealingly engages the inside surface of passage 50.

An ignition electrode assembly 48 includes a rod-shaped ignition electrode 54 of electrically conducive construction telescopically surrounded by a tubular insulator sleeve 56. In the exemplary embodiment of the disclosure, the outer surface of insulator sleeve is telescopically received within the hollow interior of tip orifice 90, which is part of the burner nozzle and functions as the ground electrode of the spark electrode arrangement. As shown in FIG. 1, there may be a radial gap or space between a major portion of the outer surface of sleeve 56 and the opposing inside surface of tip orifice 90, with a tight fit being formed at the lower end of the sleeve and tip to prevent entry of fuel mixture. A separate ground electrode sleeve could be provided as part of electrode assembly 48, if desired. The tip of spark electrode 54 is exposed, and is centrally positioned within the array of outlet ports 34, 40 as best seen in FIG. 2.

The outer end of ignition electrode 54 is electrically connected and secured to a mounting nut 60 that is threadably received within a conductor plate 62. Conductor plate 62 is mounted within an insulator housing 64. An ignition module subassembly 66 includes housing 64 and plate 62 in assembly with an ignition coil 68. Ignition coil 68 includes a primary winding 70 (FIG. 6) having an input terminal 72 (FIGS. 1 and 5) for receiving a spark ignition signal from external control circuitry, and a secondary winding 73 with an output terminal 74 connected to plate 62. A second input terminal 76 (FIGS. 5 and 6) is connected to electrical ground. After assembly of coil 68 within housing 64 and connection of terminals 72-76 as described, housing 64 preferably is filled with suitable potting material 78. Housing 64 with coil 68 is mounted within a pocket 84 in burner mounting block 42. The assembly 68 of electrode 54, insulator 56 and nut 60 preferably are removable from ignition module subassembly 66 for maintenance and repair purposes. A cover 80 is secured to housing 64 by screws 82 to cover the ignition electrode in assembly.

Ignition electrode 54 thus is insulated from burner mounting block 42 and ground electrode/tip 90, while ground electrode/tip 90 preferably is electrically connected to burner block 42. Burner block 42 preferably is physically and electrically connected to suitable grounded mounting structure for moving the burner into and out of alignment with mold 12. Fuel and oxidant are fed to nozzle 56 through passages 46, 44, and the gas emerging from burner nozzle 26 is ignited by application of electrical energy to ignition electrode 54 through coil 68. Disposition of both the ignition electrode and the ground electrode within the annular array of gas outlet ports, particularly in combination with the preferred slot-shaped geometry of oxidant outlet ports 40 as previously described which form an oxygen-rich central portion in the gas mixture, reduces or eliminates deposition of soot between ignition electrode 54 and ground electrode/tip 90. Furthermore, the ignition and ground electrodes are provided in a single assembly with the burner nozzle.

The present disclosure thus provides a glassware mold lubrication system and burner that fully satisfy all of the objects and aims previously set forth. The disclosure has been presented in conjunction with an exemplary presently preferred embodiment, and various modifications and variations have been discussed. Other modifications and variations readily will suggest themselves to persons of ordinary skill in the art in view of the foregoing description. The disclosure is intended to embrace all such modifications and variations as fall within the spirit and broad scope of the appended claims.

The invention claimed is:

1. A burner for depositing soot on a glassware mold, which includes:
    a burner block of electrically conductive construction, said burner block having an opening and separate passages extending through said burner block for feeding fuel and oxidant to said opening,
    a burner nozzle of electrically conductive construction removably received in said opening, said burner nozzle having an annular array of individual gas outlet ports, a fuel passage aligned with a said first of said passages in said burner block and connected to a first plurality of said outlet ports, an oxidant passage aligned with a second of said oxidant passages in said burner block and connected to a second plurality of said outlet ports, and an electrode passage extending through said burner nozzle centrally within said annular array of gas outlet ports,
    said first plurality of outlet ports alternating with said second plurality of outlet ports around said annular array such that said array presents alternate fuel and oxidant outlet ports around said annular array,
    an ignition electrode assembly removably received in said electrode passage in said burner nozzle for igniting fuel and oxidant emerging from said outlet ports, said electrode assembly including a rod-shaped ignition electrode surrounded by an insulating sleeve insulating said electrode from said burner nozzle,
    an electrical coil carried by said burner block, said electrical coil having an input terminal for receiving an ignition signal and an output terminal coupled to said ignition electrode, and
    a conductor plate electrically connected to said output terminal of said electrical coil, said ignition electrode being electrically connected to said conductor plate,
    wherein said electrical coil is potted within a housing mounted on said burner block, said output terminal of said coil being connected to said conductor plate and said ignition electrode assembly being threadably received onto said conductor plate, and
    wherein said first plurality of outlet ports comprise individual circular outlet ports, and said second plurality of outlet ports comprise individual slots that alternate within said array of outlet ports with said circular outlet ports and have long dimensions oriented radially of said annular array so as to produce a mixture of fuel and oxidant with a central portion that is oxidant rich.

2. The burner set forth in claim 1 wherein said ignition electrode is carried by a mounting nut that is threadably connected to said conductor plate at a location spaced from where said output terminal is connected to said conductor plate so that electrical energy is applied to said ignition electrode through said electrical coil, said output terminal of said electrical coil, said conductor plate, and said mounting nut.

3. A burner for depositing soot on a glassware mold, which includes:
    a burner block of electrically conductive construction, said burner block having an opening and separate passages extending through said burner block for feeding fuel and oxidant to said opening, a burner nozzle of electrically conductive construction removably received in said opening, said burner nozzle having an array of gas outlet ports, a fuel passage aligned with a said first of said passages in said burner block and connected to a first plurality of said outlet ports, an oxidant passage aligned with a second of said passages in said burner block and connected to a second plurality of said outlet ports, and an electrode passage extending through said burner nozzle within said array of gas outlet ports, an ignition electrode assembly removably received in said electrode passage in said burner nozzle for igniting fuel and oxidant emerging from said outlet ports, said electrode assembly including an ignition electrode surrounded by an insulating sleeve insulating said electrode from said burner nozzle, an electrical coil carried by said burner block, said electrical coil having an input terminal for receiving an ignition signal and an output terminal coupled to said ignition electrode, and a conductor plate electrically connected to said output terminal of said electrical coil, said ignition electrode being electrically connected to said conductor plate, wherein said ignition electrode is carried by a mounting nut that is threadably connected to said conductor plate at a location spaced from where said output terminal is connected to said conductor plate so that electrical energy is applied to said ignition electrode through said electrical coil, said output terminal of said electrical coil, said conductor plate, and said mounting nut.

4. The burner set forth in claim 3 wherein said ignition coil, said conductor plate and said ignition electrode are carried by a housing and are mounted onto said burner block as a subassembly with said housing.

5. The burner set forth in claim 4 wherein said housing is formed from an electrically insulating material to electrically insulate said conductor plate and said electrical coil from said burner block.

6. A burner for depositing soot on a glassware mold, which includes:

a burner block of electrically conductive construction, said burner block having an opening and separate passages extending through said burner block for feeding fuel and oxidant to said opening, a burner nozzle of electrically conductive construction removably received in said opening, said burner nozzle having an annular array of individual gas outlet ports, a fuel passage aligned with a said first of said passages in said burner block and connected to a first plurality of said outlet ports, an oxidant passage aligned with a second of said oxidant passages in said burner block and connected to a second plurality of said outlet ports, and an electrode passage extending through said burner nozzle centrally within said annular array of gas outlet ports, said first plurality of outlet ports alternating with said second plurality of outlet ports around said annular array such that said array presents alternate fuel and oxidant outlet ports around said annular array, an ignition electrode assembly removably received in said electrode passage in said burner nozzle for igniting fuel and oxidant emerging from said outlet ports, said electrode assembly including a rod-shaped ignition electrode surrounded by an insulating sleeve insulating said electrode from said burner nozzle, an electrical coil carried by said burner block, said electrical coil having an input terminal for receiving an ignition signal and an output terminal coupled to said ignition electrode, and a conductor plate electrically connected to said output terminal of said electrical coil, said ignition electrode being electrically connected to said conductor plate, wherein said electrical coil is potted within a housing mounted on said burner block, said output terminal of said coil being connected to said conductor plate and said ignition electrode assembly being threadably received onto said conductor plate, and wherein said ignition electrode is carried by a mounting nut that is threadably connected to said conductor plate at a location spaced from where said output terminal is connected to said conductor plate so that electrical energy is applied to said ignition electrode through said electrical coil, said output terminal of said electrical coil, said conductor plate, and said mounting nut.

7. The burner set forth in claim 6 wherein said ignition coil, said conductor plate and said ignition electrode are carried by a housing and are mounted onto said burner block as a subassembly with said housing.

8. The burner set forth in claim 7 wherein said housing is formed from an electrically insulating material to electrically insulate said conductor plate and said electrical coil from said burner block.

9. The burner set forth in claim 6 wherein said first plurality of outlet ports comprise individual circular outlet ports, and said second plurality of outlet ports comprise individual slots that alternate within said array of outlet ports with said circular outlet ports and have long dimensions oriented radially of said annular array so as to produce a mixture of fuel and oxidant with a central portion that is oxidant rich.

\* \* \* \* \*